United States Patent
Okamura et al.

(10) Patent No.: US 6,809,145 B1
(45) Date of Patent: Oct. 26, 2004

(54) HARD SURFACE-TREATING AGENT, STAIN-PROOFING AGENT AND SURFACE-TREATING METHOD

(75) Inventors: Kiyoshi Okamura, Fujisawa (JP); Shinji Takano, Ayase (JP); Seigo Shinohara, Chigasaki (JP)

(73) Assignee: Taiho Industries Co., Ltd., Tokyo (JP)

( * ) Notice: Subject to any disclaimer, the term of this patent is extended or adjusted under 35 U.S.C. 154(b) by 207 days.

(21) Appl. No.: 09/926,072

(22) PCT Filed: Nov. 9, 2000

(86) PCT No.: PCT/JP00/07887

§ 371 (c)(1),
(2), (4) Date: Nov. 15, 2001

(87) PCT Pub. No.: WO01/48109

PCT Pub. Date: Jul. 5, 2001

(30) Foreign Application Priority Data

Dec. 27, 1999 (JP) ........................ H-11-370885

(51) Int. Cl.[7] .................................................. C08K 3/32
(52) U.S. Cl. ..................................... 524/497; 524/275
(58) Field of Search ................................ 524/275, 276, 524/277, 430, 398, 478, 480, 487, 497

(56) References Cited

U.S. PATENT DOCUMENTS 4,442,140 A * 4/1984 Kawabata et al. .......... 427/154
4,594,109 A * 6/1986 Kawabata .................. 106/271

FOREIGN PATENT DOCUMENTS

| EP | 913447 | 7/1997 |
|----|--------|--------|
| JP | 3042743 | 6/1997 |
| JP | 9-220524 | 8/1997 |
| JP | 11-1630 | 6/1999 |

* cited by examiner

*Primary Examiner*—Edward J. Cain
*Assistant Examiner*—Katarzyna Wyrozebski
(74) *Attorney, Agent, or Firm*—Arent Fox, PLLC

(57) ABSTRACT

This invention provides a surface-treating agent, as a hard surface-treatment or stain-proofing agent, comprising titanium oxide of an anatase form, a thermoplastic resin and an organic medium, the titanium oxide and the thermoplastic resin being dispersed in the organic medium, wherein the content of the titanium oxide is within the range of 0.05–20 wt % and the content of the thermoplastic resin within the range of 0.05–20 wt %. This surface-treating agent is usable for vehicles such as cars and aircrafts, office furniture, or buildings, and has a good workability, stain-proofing effect and water spot formation-preventing effect.

9 Claims, No Drawings

HARD SURFACE-TREATING AGENT, STAIN-PROOFING AGENT AND SURFACE-TREATING METHOD

FIELD OF THE INVENTION

This invention relates to a hard surface-treating agent, stain-proofing agent and a surface-treating method using these agents, more particularly to a hard surface-treating agent for keeping the coated surfaces of vehicles such as cars and aircrafts, office furniture, buildings, etc. in a clean state for a long period of time, a stain-proofing agent for preventing the coated surfaces from being stained, and a surface-treating method using these agents.

BACKGROUND OF THE INVENTION

It is already known that titanium oxide of an anatase form coated on the surfaces of tiles and glass articles renders these surfaces hydrophilic, stain-proof or antibacterial, which are caused by light-excitation of titanium oxide through its absorption of a light having a specific wavelength. It is nowadays used in various surface-treating agents.

However, normally, conventional surface-treating agents containing titanium oxide employ an acrylic silicone, etc. as a binder for keeping the titanium oxide on the surfaces. Therefore, the conventional surface-treating agents require a coating process step similar to that required for coating paints. Therefore, general users can hardly handle these conventional agents.

Car waxes are well known as a surface-treating agent for affording the surface-protecting or stain-proofing property to the coated surface of car bodies. The car waxes vary depending upon the objective performance or manufacturers' know-how, but in general they contain a wax component and silicone oil component for protecting the car bodies, and an organic solvent or water as a dispersing medium, to which are added a surface active agent, abrasive, etc.

Since the conventional car waxes contain silicones as a main component, they cannot secure the stain-proofing performance on coated surfaces of cars, and stains adhered to the waxed coated surfaces cannot easily be washed out with water. Furthermore, the conventional car waxes cannot exhibit a "self-cleaning effect" that stains adhered to the surface of body can be removed by the ability of the surface itself decomposing the stains.

Still further, since conventional car waxes contain a silicone as a main component, the waxed coated surface shall have water repellency, which forms droplets of rainwater on the coated surface, which have spots of rain formed thereon when dried. Similarly, tap water used in car washing forms droplets on the coated surface, which then form spots when dried. Thus, with the conventional waxes, there is such a problem that these spots, which are generically called "water spots", are formed on the coated surfaces.

Stains can be removed by washing with water, but the spots can hardly be removed by washing with water, or even by washing with an abrasive. The reason for this is believed that the water droplets on the coated surfaces form lenses, which cause the coating to change in its nature. Since the coated surface itself changes, the water spots can hardly be removed by a mere wiping process.

Surface-treating agents for making coated surfaces hydrophilic. or stain-proofing agents are known and commercially available. General users can hardly handle these agents, and must ask a specialist to coat these agents. Thus, the general users cannot use these agents with ease.

The object of this invention is to solve the above-mentioned problem, which the conventional surface-treating agents have. That is, the object of this invention is to provide a surface-treating agent for use in coating vehicles such as cars and aircrafts, office furniture, buildings, etc., which can keep the stain-proofing performance based on the self-cleaning effect for a long period of time, and further afford a good workability in coating of this agent. The further object of this invention is to provide a surface-treating agent for use in coating vehicles such as cars and aircrafts, office furniture, buildings, etc., which can prevent the formation of water spots, keep the water spot formation-preventing effect for a long period of time, and further afford a good workability in coating of this agent.

DISCLOSURE OF THE INVENTION

As a result of the inventors' intensive studies, it has been found that the above-mentioned objects of this invention can be achieved by using the specific kind of titanium oxide fixed with a thermoplastic resin as binder.

In order to achieve the above-mentioned objects, this invention is a hard surface-treating agent characterized by comprising a dispersion of an anatase-form titanium oxide and a thermoplastic resin in an organic medium, in which the content of the anatase-form titanium oxide is within the range of 0.05 to 20 wt %, and the content of the thermoplastic resin within the range of 0.05 to 20 wt %, and a stain-proofing agent characterized by comprising a dispersion of the anatase-form titanium oxide and a thermoplastic resin in an organic medium, in which the content of the anatase-form titanium oxide is within the range of 0.05 to 20 wt % and the content of the thermoplastic resin within the range of 0.05 to 20 wt %, and further a surface-treating method of applying said hard surface-treating agent or stain-proofing agent onto coated surfaces.

BEST MODES FOR CARRYING OUT THIS INVENTION

The hard surface-treating agent comprises the specific kind of titanium oxide, a thermoplastic resin and an organic medium.

As the titanium oxide is used an anatase-form titanium oxide (hereinafter simply referred to as "titanium oxide"). Thus, rutile- and brookite-form titanium oxides both cannot sufficiently achieve the objects of this invention.

The average particle size of titanium oxide is preferably within the range of 6 to 3,000 nm, more preferably 8 to 1,000 nm. When the average particle size is within this range, the titanium oxide forms a uniform film and does not damage the color tones of coatings themselves.

Titanium oxide products used in this invention may be a titanium oxide sol, such as TA-15, produced by Nissan Chemical Industries, Ltd. and having an average particle size of 0.01 $\mu$m and a solid content of 15%, Tinox A-6, produced by Taki Chemical Co., Ltd. and having a crystal size of 10 nm and a solid content of 6%, and Tinox H-30, produced by Taki Chemical Co., Ltd. and having a crystal size of 8 nm and a solid content of 30%; SSP-25, produced by Sakai Chemical Industry, Ltd. and having an average particle size of 9 nm; Titanium Oxide P25, produced by Nihon Aerosil, Ltd. and having an average particle size of 21 nm; $TiO_2$ produced by CI Chemical Co., Ltd. and having an average particle size of 30 nm; Tinox A-100, produced by Taki Chemical Co., Ltd. and having a crystal size of 8 nm; CSB, produced by Sakai Chemical Industry, Ltd. and having a solid content of 40%; etc.

The content of titanium oxide as solid is preferably within the range of 0.05 to 20 wt % more preferably 0.1 to 10.0 wt %. If the solid content of titanium oxide exceeds 20 wt % then applying such a hard surface-treating agent onto a coated surface will have an unfavorable effect on the coated surface. If the solid content of titanium oxide is lower than 0.05 wt %, then it will be too low to achieve the objects of this invention.

In accordance with this invention, the thermoplastic resin is added as a binder and has a function of fixing the titanium oxide on the hard surface.

As the thermoplastic resin, reference may be made to a polyolefin wax and its modified products as derivatives, and a polyolefin resin and its modified products as derivatives.

As the polyethylene wax, reference may be made to polyethylene wax, polypropylene wax, etc. As the modified product, reference may be made to an á-olefin wax, modified polyethylene wax and modified polypropylene wax.

As the polyolefin resin, reference may be made to a resin such as high-density polyethylene (HDPE), middle-density polyethylene and low-density polyethylene (LDPE), a polypropylene resin, an ethylenevinylacetate resin, and modified resins thereof, such as a functional polyolefin resin having a specified functional group added thereto.

The content of the thermoplastic resin is preferably within the range of 0.05 to 20 wt % more preferably 0.1 to 10 wt %. If the content of the thermoplastic resin exceeds 20 wt % then it will not only make the workability poor, but also lose the advantage which should be obtained by the titanium oxide. Furthermore, if the content is lower than 0.05 wt %, then it will be too low to achieve the objects of this invention.

The above-mentioned organic medium is an organic solvent or a mixed solvent of the organic solvent with water.

As the organic solvent, reference may be made to, for example, a hydrocarbon solvent, silicone solvent, and alcohol solvent. As the hydrocarbon solvent, reference may be made to industrial naphtha, kerosene, naphthene hydrocarbon solvents, paraffin hydrocarbon solvents such as isoparaffin, and aromatic hydrocarbon solvents. As the alcohol solvent, reference may be made to methanol, ethanol, n-propanol, 2-propanol, n-butanol, and 2-methylpropanol.

Of these various organic mediums, the silicone solvent is preferred.

The organic medium used in the hard surface-treating agent of this invention may be used singly or in combination of two or more of the solvents.

The mixed solvent used in the hard surface-treating agent of this invention may be obtained by mixing one or more of the above-raised solvents with water.

In the case of using the mixed solvent, a surfactant may be added thereto to emulsify the solvent.

As such surfactant, reference may be made to nonionic surfactants, anionic surfactants, cationic surfactants and ampholytic surfactants.

As the anionic surfactants, reference may be made to, for example, an organic salt such as carbonates or sulfonates, sulfuric ester or phosphoric ester, etc.

As the carbonates, reference may be made to, for example, sodium laurate, potassium laurate, sodium myristate, sodium palmitate, sodium stearate, sodium oleate, potassium oleate, and ether carbonate.

As the sulfonates, reference may be made to, for example, higher alkyl sulfonate, á-olefin sulfonate, sulfonates of higher fatty esters, dialkyl sulfosuccinates, sulfonates of higher fatty amides, and alklyaryl sulfonates such as alkyl benzene sulfonates and alkyl naphthalene sulfonates, and formaline condensates of the alkylaryl sulfonates.

As the sulfuric esters, reference may be made to, for example, sulfuric esters of higher alcohols, sulfuric esters of secondary higher alcohol, alkyl ether sulfuric esters, alkylaryl ether sulfuric esters, alkyl sulfuric esters, sulfuric esters of higher fatty acids, sulfuric esters of higher fatty alkylolamides, sulfonated oil, etc.

As the phosphoric esters, reference may be made to, for example, sodium didecyl phosphate, sodium polyoxyethylenelauryl ether phosphate, sodium polyoxyethylenecetyl ether phosphate, sodium polyoxyethyleneoleyl ether phosphate, sodium polyoxyethylenealklyphenyl ether phosphate, etc.

As the cationic surfactant, reference may be made to, for example, amine salts, quaternary ammonium salts, fluorine-containing cationic surfactants, etc.

As the amine salts, reference may be made to, for example, an alkylamine salt, polyamine, aminoalcohol fatty acid derivatives, etc.

As the quaternary ammonium salt, reference may be made to, for example, a quaternary alkyl ammonium salt, cyclic quaternary ammonium salt, quaternary ammonium salt having a hydroxyl group, quaternary ammonium salt having an ether bond, quaternary ammonium salt having an amide bond, etc.

As the fluorine-containing cationic surfactant, reference may be made to a fluoroalkyl group-containing carboxyl acid such as a perfluororalkyl carboxylic acid, a fluoroalkyl group-containing carboxylate such as a perfluoroalkyl carboxylate, a fluoroalkyl group-containing phosphate such as a perfluoroalkyl phosphate, etc.

As the ampholytic surfactant, reference maybe made to, for example, N-laurylá-alanine, N-stearylá-alanine, N,N,N-trimethylaminopropionic acid, N-hydroxyethyl N,N-dimethylaminopropionic acid, N-methyl N,N-dihydroxyethylaminopropionic acid, N,N,N-trihydroxyethylaminopropionic acid, N-lauryl N,N-dimethylaminopropionic acid, N-myristyl N,N-dimethylaminopropionic acid, N-palmityl N,N-dimethylaminopropionic acid, N-stearyl N,N-dimethylaminopropionic acid, N-hexyl N,N-dimethylaminoacetic acid, N-octyl N,N-dimethylaminoacetic acid, N-decyl N,N-dimethylaminoacetic acid, N-undecyl N,N-dimethylaminoacetic acid, N-lauryl N,N-dimethylaminoacetic acid, N-myristyl N,N-dimethylaminoacetic acid, N-palmityl N,N-dimethylaminoacetic acid, N-stearyl N,N-dimethylaminoacetic acid, 1-pyridinebetaine. 1-á-picoliniumbetaine, etc.

As the nonionic surfactant, reference may be made to, for example, nonionic ether type surfactants, nonionic ether-ester type surfactants, nonionic ester type surfactants, nonionic block-polymer type surfactants, nonionic fluorine-containing surfactants, nonionic nitrogen-containing surfactants, etc.

As the nonionic ether type surfactant, reference may be made to, for example, a nonionic ether type surfactant such as a single-chain polyoxyether; a polyoxyethylenealkyl or alkylallyl ether such as alkylpolyoxyethylene fatty alcohol ether, polyoxethylenealkylallyl ether and polyoxyethylenelanoline alcohol; and ethylene oxide derivatives of alkylphenolformalin condensates.

As the ether-ester type nonionic surfactant, reference may be made to, for example, an ester bond-containing polyoxyethylene fatty acid such as polyoxyethylenesorbitan fatty ester, polyoxyethyleneglyceryl monofatty ester, polyoxyethylenepropyleneglycol fatty ester, and polyoxyethylenesorbitol fatty ester; or polyoxyethylene derivatives of natural fats and oils or waxes.

As the ester type nonionic surfactant, reference may be made to, for example, polyoxyethylene fatty ester or polyhydric alcohol esters.

As the ester type nonionic surfactant, reference may be made to, for example, a Pluronic type nonionic surfactant, Tetronic type nonionic surfactant, or an alkyl group-containing block polymer.

As the fluorine-containing surfactant, reference may be made to fluoroalkyl group-containing alkylene oxide adducts such as a perfluoroalkylethylene oxide adduct.

As the nitrogen-containing surfactant, reference may be made to, for example, polyoxyethylene fatty amides, alkylol amides, and polyoxyalkyl amines.

The amount of the surfactant added is preferably within the range of 0.1 to 20 wt % of the mixed solvent of the organic solvent and water, more preferably within the range of 0.2 to 10 wt %.

To the hard surface-treating agent of this invention may be added additives such as waxes, dispersants, lustering agents, resins, surfactants, abrasives, powders, thickening agents, dyes, pigments, perfumes, etc.

As the waxes, reference may be made to a vegetable wax such as carnauba wax, candelilla wax, rice wax, etc., an animal wax such as beeswax, whale wax, lanoline derivatives, tallow, etc., a mineral wax, petroleum wax or synthetic wax, such as paraffin wax, microcrystalline wax, ceresin wax, Vaseline, Fischer-Tropsch wax and derivatives thereof, paraffin oxide wax, microcrystalline oxidized wax, montan wax-base doxidized waxes and derivatives thereof, olefin-based waxes comprising olefins and maleic anhydride, acrylic acid or vinyl acetate, synthetic fatty ester waxes, synthetic glycerides, fats and oils, higher alcohols, hardened oils, fatty amides, etc.

As the dispersant, reference may be made to paraffin hydrocarbon solvents such as industrial naphtha, naphthene hydrocarbon solvents, isoparaffin, etc. and aromatic hydrocarbon solvents.

As the lustering agent, reference may be made to dimethyl silicone, methylphenyl silicone, other modified silicones, perfluoropolyether, liquid paraffin, synthetic oils, polyhydric alcohols and derivatives thereof.

As the resins, reference may be made to silicone resins, petroleum resins, methacrylic resin, resin varnish, terpene resin, rosin gum, etc.

The surfactants may be whatever is used in the mixed solvents comprising the organic solvent and water.

As the abrasive, reference may be made to silica, kaolin, diatomaceous earth, zeolite, calcium carbide, aluminum hydroxide, aluminum oxide, silicon oxide, cerium oxide, magnesium oxide, etc.

As the powder, reference may be made to an inorganic powder, such as finely powdered silica and finely powdered alumina, or organic synthetic resin powders, such as polyolefin powders, tetrafluoroethylene powder, silicone powders, polyethylene powder, etc.

As the thickening agent, reference may be made to an inorganic thickening agent, such as bentonite, montmorillonite, mica, etc., a cellulose semi-synthetic polymer, such as carboxymethyl cellulose, methyl cellulose, ethyl cellulose, etc., a starch semi-synthetic polymer, such as soluble starch, carboxymetyl starch, dialdehyde starch, etc., or polyvinyl alcohol, sodium polyacrylate, galactan, tragacanth gum, Arabic gum, collagen, xanthan gum, soluble polyacrylic copolymer, gelatin, Japanese gelatin, etc.

The hard surface-treating agent of this invention can be prepared by adding titanium oxide and thermoplastic resin to the organic solvent, and then heating, uniformly dispersing with a mixer, etc., and allowing the resulting admixture to cool down to room temperature. Furthermore, the agent can be prepared by adding titanium oxide and thermoplastic resin to the mixed solvent obtained by mixing the organic solvent with water, or the mixed solvent obtained by uniformly mixing the organic solvent, water and surfactant through a mixer, etc., and then in the same manner as mentioned above. Still further, the agent can be prepared by mixing the titanium oxide, thermoplastic resin, organic solvent and water at one time, and adding the surfactant, if desired, and then heating, uniformly dispersing with a mixer, etc., and allowing the resulting admixture to cool down to room temperature.

The hard surface-treating agent of this invention can be used in the same manner as a conventional surface-treating agent such as car waxes is used. That is, the surface treating process of this invention is completed by the steps: an applying step, in which a desired amount of the hard surface-treating agent of this invention is taken on a cloth or sponge piece, and the agent is applied on the surface intended to be applied; a drying step; and a wiping-away step, in which the applied and dried hard surface-treating agent is wiped away with a cloth from the applied surface. Thus, a titanium oxide-containing film is formed on the hard surface.

The hard surface-treating agent of this invention has a stain-proofing effect and a water spot formation-preventing effect. Therefore, the hard surface-treating agent of this invention is a stain-proofing agent as well as an agent for preventing the formation of water spots.

EXAMPLE 1

10 wt % of titanium oxide (trade name: P25, made by Nihon Aerosil Co., Ltd.; average particle size: 21 nm), 10 wt % of polyethylene wax (trade name: Hiwax 100P, made by Mitsui Petrochemical Industries, Ltd.; high density; melting point: 116° C.), 15 wt % of dimethyl silicone (trade name: SH-200, made by Toray Dow Corning, Inc.; viscosity: 10 cs), and 65 wt % of kerosene were mixed, heated to 120° C., uniformly dispersed with a mixer, and then allowed to cool down to room temperature to prepare a hard surface-treating agent of a W/O type.

EXAMPLE 2

15 wt % of titanium oxide (trade name: Tinox A-100, made by Taki Chemical Co., Ltd.; crystal size: 8 nm), 5 wt % of an acid-modified polyethylene wax (trade name: Hiwax 1105A, made by Mitsui Petrochemical Industries, Ltd.; melting point: 104° C.), 15 wt % of dimethyl silicone (trade name: SH-200, made by Toray Dow Corning, Inc.; viscosity: 10 cs), and 65 wt % of kerosene were mixed, heated to 110° C. uniformly dispersed, and allowed to cool down to room temperature to prepare a hard surface-treating agent of a W/O type.

EXAMPLE 3

5 wt % of titanium oxide (trade name: P25, made by Nihon Aerosil Co., Ltd.; an average particle size: 21 nm), 10 wt % of a specific monomer modified polyethylene wax (trade name: Hiwax 1120H, made by Mitsui Petrochemical Industries, Ltd.; melting point: 107° C.), 5 wt % of dimethyl silicone (trade name: SH-200, made by Toray Dow Corning, Inc.; viscosity: 10 cs), 10 wt % of a cyclic silicone (trade name: TSF405, made by GE-Toshiba Silicone, Inc.), and 70 wt % of kerosene were mixed, heated to 110° C., uniformly dispersed with a mixer, and allowed to cool down to room temperature to prepare a hard surface-treating agent of a W/O type.

EXAMPLE 4

10 wt % of titanium oxide (trade name: Tinox A-100, made by Taki Chemical Co., Ltd.; crystal size: 8 nm), 10 wt % of polypropylene wax (trade name: Hiwax NP105, made by Mitsui Petrochemical Industries, Ltd.; melting point: 140° C.), 15 wt % of dimethyl silicone (trade name: SH-200, made by Toray Dow Corning, Inc.; viscosity: 2 cs), 65 wt % of kerosene were mixed, heated to 145° C., uniformly dispersed with a mixer, and allowed to cool down to room temperature to prepare a hard surface-treating agent of a W/O type.

EXAMPLE 5

15 wt % of titanium oxide (trade name: Tinox A-100, made by Taki Chemical Co., Ltd.; crystal size: 8 nm), 5 wt % of polyethylene wax (trade name: Hiwax 100P, made by Mitsui Petrochemical Industries, Ltd.; high density; melting point: 116° C.), 5 wt % of a montan oxidized wax (trade name: Hoechst Wax S, made by Hoechst Japan Ltd.; melting point: 84° C.), 10 wt % of dimethyl silicone (trade name: SH-200, made by Toray Dow Corning, Inc.; viscosity: 10 cs), and 65 wt % of kerosene were mixed, heated to 120° C., uniformly dispersed with a mixer, and allowed to cool down to room temperature to prepare a hard surface-treating agent of a W/O type.

EXAMPLE 6

15 wt % of titanium oxide (trade name: P25, made by Nihon Aerosil Co., Ltd.; average particle size: 21 nm), 10 wt % of polyethylene wax (trade name: Hiwax 100P, made by Mitsui Petrochemical Industries, Ltd.; high density; melting point: 116° C.), 15 wt % of dimethyl silicone (trade name: SH-200, made by Toray Dow Corning, Inc.; viscosity: 10 cs), 50 wt % of kerosene, and 10 wt % of aluminum oxide (trade name: Alumina A-34, made by Nippon Light Metal Co., Ltd.; average particle size: 4 μm) were mixed, heated to 120° C., uniformly dispersed with a mixer, and allowed to cool down to room temperature to prepare a hard surface-treating agent of a W/O type.

EXAMPLE 7

10 wt % of titanium oxide (trade name: Tinox A-100, made by Taki Chemical Co., Ltd.; crystal size: 8 nm), 10 wt % of polypropylene wax (trade name: Hiwax NP105, made by Mitsui Petrochemical Industries, Ltd.; melting point: 140° C.), 10 wt % of dimethyl silicone (trade name: SH-200, made by Toray Dow Corning, Inc.; viscosity: 10 cs), 10 wt % of a cyclic silicone (trade name: TSF405, made by GE-Toshiba Silicone, Inc.), 50 wt % of kerosene, and 10 wt % of aluminum oxide (trade name: Alumina A-34, made by Nippon Light Metal Co., Ltd.; average particle size: 4 μm) were mixed, heated to 145° C., uniformly dispersed with a mixer, and allowed to cool down to room temperature to prepare a hard surface-treating agent of a W/O type.

EXAMPLE 8

Polyethylene wax (trade name: Hiwax 100P, made by Mitsui Chemical Industries, Ltd.; high density; melting point: 116° C.), dimethyl silicone (trade name: SH-200, made by Toray Dow Corning, Inc.; viscosity: 10 cs) and kerosene were mixed while being heated to 120° C. then allowed to cool to 95° C., which was then admixed with a 95° C. heated mixed liquid of titanium oxide sol (trade name: CSB, made by Sakai Chemical Industry Co., Ltd.; solid content: 40%) and POE nonylphenyl ether (trade name: EA-120, made by Daiichi Seiyaku Co., Ltd.; HLB: 12), so that the resulting mixture had a composition of 25 wt % of the titanium oxide sol, 10 wt % of the polyethylene wax, 15 wt % of the dimethyl silicone, 5 wt % of the POE nonylphenyl ether, 30 wt % of the kerosene and 15 wt % of tap water, which was then agitated with a mixer to be entirely emulsified, allowed to cool down to room temperature to prepare a hard surface-treating agent in a semi-paste emulsion form.

EXAMPLE 9

Polypropylene wax (trade name: Hiwax NP 105, made by Mitsui Petrochemical Industries, Ltd.; melting point: 140° C.), dmethyl silicone (trade name: SH-200, made by Toray Dow Corning, Inc.; viscosity: 10 cs) and kerosene were mixed while being heated to 145° C., then allowed to cool down to 95° C., which was then admixed with 95° C. heated mixed liquid of tap water, titanium oxide (trade name: Tinox H-30, made by Taki Chemical Co., Ltd.; crystal size: 8 nm; solid content 30%), an alkylbenzensulfonic amine salt (trade name: Neogen T, made by Daiichi Seiyaku Co., Ltd.), and CMC (trade name: Cellogen F-BSH-12, made by Daiichi Seiyaku Co., Ltd.), so that the resulting mixture had a composition of 10 wt % of the titanium oxide, 5 wt % of the polypropylene wax, 10 wt % of the dimethyl silicone, 5 wt % of the alkylbenzensulfonic amine salt, 40 wt % of the kerosene, and 29 wt % of tap water, and 1 wt % of the CMC, which was then agitated with a mixer to be entirely emulsified, allowed to cool down to room temperature to prepare a hard surface-treating agent in a semi-paste emulsion form.

EXAMPLE 10

A specific modified polyethylene wax (trade name: Hiwax 1120H, made by Mitsui Petrochemical Industries, Ltd.; melting point: 107° C.), montan oxidized wax (trade name: Hoechst Wax S, made by Hoechst Japan Ltd.; melting point: 84° C.), dimethyl silicone (trade name: SH-200, made by Toray Dow Corning, Inc.; viscosity: 10 cs) and kerosene were mixed while being heated to 110° C. then allowed to cool down to 95° C., which was then admixed with a 95° C. heated mixed liquid of tap water, titanium oxide (trade name: Tinox H-30, made by Taki Chemical Co., Ltd.; crystal size: 8 nm; solid content 30%), and POE nonylphenyl ether (trade name: EA-120, made by Daiichi Seiyaku Co., Ltd.; HLB: 12), so that the resulting mixture had a composition of 15 wt % of the titanium oxide, 10 wt % of the specific modified polyethylene wax, 2 wt % of the montan oxidized wax, 10 wt % of the dimethyl silicone, 3 wt % of the POE nonylphenyl ether, 25 wt % of the kerosene and 35 wt % of tap water, which was then agitated with a mixer to be entirely emulsified, allowed to cool down to room temperature to prepare a hard surface-treating agent in a semi-paste emulsion form.

EXAMPLE 11

A specific modified polyethylene wax (trade name: Hiwax 1105A, made by Mitsui Petrochemical Industries, Ltd.;

melting point: 104° C.), montan oxidized wax (trade name: Hoechst Wax S, made by Hoechst Japan Ltd.; melting point: 84° C.), dimethyl silicone (trade name: SH-200, made by Toray Dow Corning, Inc.; viscosity: 10 cs) and kerosene were mixed while being heated to 110° C., then allowed to cool down to 95° C., which was then admixed with a 95° C. heated mixed liquid of tap water, titanium oxide (trade name: Tinox H-30, made by Taki Chemical Co., Ltd.; crystal size: 8 nm; solid content 30%), and POE nonylphenyl ether (trade name: EA-120, made by Daiichi Seiyaku Co., Ltd.; HLB: 12), so that the resulting mixture had a composition of 30 wt % of the titanium oxide, 10 wt % of the specific modified polyethylene wax, 2 wt % of the montan oxidized wax, 10 wt % of the dimethyl silicone, 3 wt % of the POE nonylphenyl ether, 30 wt % of the kerosene and 15 wt % of tap water, which was then agitated with a mixer to be entirely emulsified, allowed to cool down to room temperature to prepare a hard surface-treating agent in a semi-paste emulsion state.

EXAMPLE 12

A polyethylene wax (trade name: Hiwax 100P, made by Mitsui Petrochemical Industries, Ltd.; melting point: 116° C.), dimethyl silicone (trade name: SH-200, made by Toray Dow Corning, Inc.; viscosity: 10 cs) and kerosene were mixed while being heated to 120° C., then allowed to cool down to 95° C., which was then admixed with a 95° C. heated mixed liquid of tap water, titanium oxide (trade name: P25, made by Nihon Aerosil Co., Ltd.; average particle size: 21 nm), an alkylbenzenesulfonic amine salt (trade name: Neogen T, made by Daiichi Seiyaku Co., Ltd.) and aluminum oxide (trade name: Alumina A-34, made by Nippon Light Metal Co., Ltd.; average particle size: 4 μm), so that the resulting mixture had a composition of 10 wt % of the titanium oxide, 10 wt % of the polyethylene wax, 15 wt % of the dimethyl silicone, 5 wt % of the alkylbenzenesulfonic amine salt, 20 wt % of the kerosene, 25 wt % of tap water and 10 wt % of tap water and 10 wt % of the aluminum oxide, which was then agitated with a mixer to be entirely emulsified, allowed to cool down to room temperature to prepare a hard surface-treating agent in a semi-paste emulsion form.

EXAMPLE 13

A polypropylene wax (trade name: Tinox A-100, made by Taki Chemical Co., Ltd.; crystal size: 8 nm), dimethyl silicone (trade name: SH-200, made by Toray Dow Corning, Inc.; viscosity: 10 cs), a cyclic silicone (trade name: TSF 405, made by GE-Toshiba Silicone, Inc.) and kerosene were mixed while being heated to 145° C., then allowed to cool down to 95° C., which was then admixed with a 95° C. heated mixed liquid of tap water, titanium oxide (trade name: Tinox A-100, made by Taki Chemical Co., Ltd.; crystal size: 8 nm), POE nonylphenyl ether (trade name: EA-120, made by Daiichi Seiyaku Co., Ltd.; HLB: 12), aluminum oxide (Alumina A-34, made by Nippon Light Metal Co., Ltd.) and xanthan gum (trade name: KELZAN, made by Sansho, Ltd.), so that the resulting mixture had a composition of 10 wt % of the titanium oxide, 10 wt % of the polypropylene wax, 10 wt % of the dimethyl silicone, 10 wt % of the cyclic silicone, 5 wt % of the POE nonylphenyl ether, 25 wt % of kerosene and 19 wt % of tap water, 10 wt % of the aluminum oxide and 1 wt % of the xanthan gum, which was then agitated with a mixer to be entirely emulsified, allowed to cool down to room temperature to prepare a hard surface-treating agent in a semi-paste emulsion form.

EXAMPLE 14

A propylene wax (trade name: Hiwax NP 105, made by Mitsui Petrochemical Industries, Ltd.; melting point: 140° C.), montan oxidized wax (trade name: Hoechst Wax S, made by Hoechst Japan Ltd.; melting point: 84° C.), dimethyl silicone (trade name: SH-200, made by Toray Dow Corning, Inc.; viscosity: 10 cs), a cyclic silicone (trade name: TSF 405, made by GE-Toshiba Silicone, Inc.) and kerosene were mixed while being heated to 145° C., then allowed to cool down to 95° C., which was then admixed with a 95° C. heated mixed liquid of tap water, a titanium oxide sol (trade name: CSB, made by Sakai Chemical Industry, Ltd.; solid content: 40%) and an aklybenzene-sulfonic amine salt (trade name: Neogen T, made by Daiichi Seiyaku Co., Ltd.), so that the resulting mixture had a composition of 25 wt % of the titanium oxide sol, 10 wt % of the polypropylene wax, 5 wt % of the montan oxidized wax, 10 wt % of the dimethyl silicone, 5 wt % of the cyclic silicone, 3 wt % of the alkylbenzenesulfonic amine salt, 30 wt % of the kerosene and 12 wt % of tap water, which was then agitated with a mixer to be entirely emulsified, allowed to cool down to room temperature to prepare a hard surface-treating agent in a semi-paste emulsion form.

EXAMPLE 15

A polyethylene wax (trade name: Hiwax 100P, made by Mitsui Petrochemical Industries, Ltd.; melting point: 116° C.), dimethyl silicone (trade name: SH-20, made by Toray Dow Corning, Inc.; viscosity: 2 cs), an alkylbenzenesulfonic triethanol amine salt (trade name: Neogen T, made by Daiichi Seiyaku Co., Ltd.) and kerosene were mixed while being heated to 120° C., then allowed to cool down to 95° C., which was then admixed with a 95° C. heated mixed liquid of tap water and a titanium oxide sol (trade name: CSB, made by Sakai Chemical Industry Co., Ltd.; solid content: 40%), so that the resulting mixture had a composition of 25 wt % of the titanium oxide sol, 10 wt % of the polyethylene wax, 15 wt % of the dimethyl silicone, 1 wt % of the alkylbenzenesulfonic triethanol amine salt, 30 wt % of the kerosene and 19 wt % of tap water, which was then agitated with a mixer to be entirely emulsified, allowed to cool down to room temperature to prepare a hard surface-treating agent in a semi-paste emulsion form.

Comparative Example 1

15 wt % of an acid-modified polyethylene wax (trade name: Hiwax 1105A, made by Mitsui Petrochemical Industires, Ltd.; melting point: 104° C.), 15 wt % of dimethyl silicone (trade name: SH-200, made by Toray Dow Corning, Inc.; viscosity: 10 cs), and 70 wt % of kerosene were mixed, heated to 110° C., uniformly dispersed with a mixer, and then allowed to cool down to room temperature to prepare a hard surface-treating agent.

Comparative Example 2

10 wt % of a polypropylene wax (trade name: Hiwax NP 105, made by Mitsui Petrochemical Industries, Ltd.; melting point: 140° C.), 15 wt % of a cyclic silicone (trade name: TSF 405, made by GE Toshiba, Inc.), 75 wt % of kerosene were mixed, heated to 145° C., uniformly dispersed with a mixer, and then allowed to cool down to room temperature to prepare a hard surface-treating agent.

Comparative Example 3

A polyethylene wax (trade name: Hiwax 100P, made by Mitsui Petrochemical Industries, Ltd.; high density; melting point: 116° C.), montan oxidized wax (trade name: Hoechst Wax S, made by Hoechst Japan Ltd.; melting point: 84° C.), dimethyl silicone (trade name: SH-200, made by Toray Dow Corning, Inc.; viscosity: 10 cs) and kerosene were mixed while being heated to 120° C., then allowed to cool down to 95° C., which was then admixed with a 95° C. heated mixed liquid of tap water and POE nonylphenyl ether (trade name: EA-120, made by Daiichi Seiyaku Co., Ltd.; HLB: 12), so that the resulting mixture had a composition of 10 wt % of the polyethylene wax, 5 wt % of the montan oxidized wax, 15 wt % of the dimethyl silicone, 3 wt % of the POE nonylphenyl ether, 30 wt % of the kerosene and 37 wt % of tap water, which was then agitated with a mixer to be entirely emulsified, allowed to cool down to room temperature to prepare a hard surface-treating agent in a semi-paste emulsion form.

Comparative Example 4

Titanium oxide (trade name: Nihon Aerosil, Ltd.; average particle size: 21 nm), a polyethylene wax (trade name: Hiwax 100P, made by Mitsui Petrochemical Industries, Ltd.; high density; melting point: 116° C.), a cyclic silicone (trade name: TSF 405, made by GE-Toshiba, Inc.), and kerosene were mixed while being heated to 120° C., so that the resulting mixture had a composition of 25 wt % of the titanium oxide, 5 wt % of the polyethylene wax, 15 wt % of the cyclic silicone and 55 wt % of the kerosene, and then allowed to cool down to 95° C. to prepare a hard surface-treating agent.

Comparative Example 5

15 wt % of titanium oxide (trade name: Tinox A-100, made by Taki Chemical Co., Ltd.; crystal size: 8 nm), 25 wt % of a specific monomer-modified polyethylene wax (trade name: Hiwax 1120H, made by Mitsui Petrochemical Industries, Ltd.; melting point: 107° C.), 20 wt % of dimethyl silicone (trade name: SH-200, made by Toray Dow Corning, Inc.; viscosity: 10 cs), and 40 wt % of kerosene were mixed, heated to 110° C., uniformly dispersed with a mixer, and allowed to cool down to room temperature to prepare a hard surface-treating agent.

Comparative Example 6

25 wt % of titanium oxide (trade name: Tinox A-100, made by Taki Chemical Co., Ltd.; crystal size: 8 nm), 10 wt % of a polypropylene wax (trade name: Hiwax NP 105, made by Mitsui Petrochemical Industries, Ltd.; melting point: 140° C.), 15 wt % of dimethyl silicone (trade name: SH-200, made by Toray Dow Corning, Inc.; viscosity: 10 cs), 40 wt % of kerosene, and 10 wt % of aluminum oxide (trade name: Alumina A-34, made by Nippon Light Metal Co., Ltd.; average particle size: 4 μm) were mixed, heated to 145° C., uniformly dispersed, and allowed to cool down to room temperature to prepare a hard surface-treating agent.

Comparative Example 7

10 wt % of titanium oxide (trade name: P25, made by Nihon Aerosil, Ltd.; average particle size: 21 nm), 25 wt % of an acid-modified polyethylene wax (trade name: Hiwax 1105A, made by Mitsui Petrochemical Industries, Ltd.; melting point: 104° C.), 10 wt % of dimethyl silicone (trade name: SH-200, made by Toray Dow Corning, Inc.; viscosity: 10 cs), 45 wt % of kerosene, and 10 wt % of aluminum oxide (trade name: Alumina A-34, made by Nippon Light Metal Co., Ltd.; average particle size: 4 μm) were mixed, heated to 110° C., uniformly dispersed, and allowed to cool down to room temperature to prepare a hard surface-treating agent.

Comparative Example 8

A polyethylene wax (trade name: Tinox A-100, made by Taki Chemical Co., Ltd.; crystal size: 8 nm), montan oxidized wax (trade name: Hoechst S, made by Hoechst Japan Ltd.; melting point: 84° C.), dimethyl silicone (trade name: SH-200, made by Toray Dow Corning, Inc.; viscosity: 10 cs), and kerosene were mixed while being heated to 120° C., then allowed to cool to 95° C., which was then admixed with a 95° C. heated mixed liquid of tap water and POE nonylphenyl ether (trade name: EA-120, made by Daiichi Seiyaku Co., Ltd.; HLB: 12), so that the resulting mixture had a composition of 10 wt % of the polyethylene wax, 5 wt % of the montan oxidized wax, 15 wt % of the dimethyl silicone, 3 wt % of the POE nonylphenyl ether, 30 wt % of kerosene and 37 wt % of tap water, which was then agitated with a mixer to be entirely emulsified, allowed to cool down to room temperature to prepare a hard surface-treating agent in a semi-paste emulsion form.

Comparative Example 9

A polypropylene wax (trade name: Hiwax NP105, made by Mitsui Petrochemical Industries, Ltd.; melting point: 140°), dimethyl silicone (trade name: SH-200, made by Toray Dow Corning, Inc.; viscosity: 10 cs) and kerosene were mixed while being heated to 145° C., then allowed to cool down to 95° C., which was then admixed with a 95° C. heated mixed liquid of tap water, titanium oxide (trade name: Tinox A-100, made by Taki Chemical Co., Ltd.; crystal size: 8 nm) and an alkylbenzensulfonic amine salt (trade name: Neogen T, made by Daiichi Seiyaku Co., Ltd.), so that the resulting mixture had a composition of 25 wt % of the titanium oxide, 5 wt % of the polypropylene wax, 10 wt % of the dimethyl silicone, 5 wt % of the alkylbenzene-sulfonic amine salt, 25 wt % of kerosene and 30 wt % of tap water, which was then agitated with a mixer to be entirely emulsified, allowed to cool down to room temperature to prepare a hard surface-treating agent in a semi-paste emulsion form.

Comparative Example 10

A polyethylene wax (trade name: Hiwax 100P, made by Mitsui Petrochemical Industries, Ltd.; high density; melting point: 116° C., polypropylene wax (trade name: Hiwax NP 105, made by Mitsui Petrochemical Industries, Ltd.; melting point: 140° C.), dimethyl silicone (trade name: SH-200, made by Toray Dow Corning, Inc.; viscosity: 10 cs) and kerosene were mixed while being heated to 120° C., then allowed to cool down to 95° C., which was then admixed with a 95° C. heated mixture of tap water, POE nonylphenyl ether (trade name: EA-120, made by Daiichi Seiyaku Co., Ltd.; HLB: 12) and aluminum oxide (trade name: Alumina A-34, made by Nippon Light Metal Co., Ltd.; average particle size: 4 μm), so that the resulting mixture had a composition of 5 wt % of the polyethylene wax, 5 wt % of the polypropylene wax, 15 wt % of the demethyl silicone, 5 wt % of the POE nonylphenyl ether, 30 wt % of kerosene, 30 wt % of tap water, and 10 wt % of the aluminum oxide, which was then agitated with a mixer to be entirely emulsified, allowed to cool down to room temperature to prepare a hard surface-treating agent in a semi-paste emulsion form.

Comparative Example 11

A specific monomer-modified polyethylene wax (trade name: Hiwax 1120H, made by Mitsui Petrochemical Industries, Ltd.; melting point: 107° C.), dimethylene silicone (trade name: SH-200, made by Toray Dow Corning, Inc.; viscosity: 10 cs) and kerosene were mixed while being heated to 110° C., then admixed with a 95° C. heated mixture of titanium oxide (trade name: Tinox H-30, made by Taki Chemical Co., Ltd.; crystal size: 8 nm; solid content: 30%), POE nonylphenyl ether (trade name: EA-120, made by Daiichi Seiyaku Co., Ltd.; HLB: 12) and aluminum oxide (trade name: Alumina A-34, made by Nippon Light Metal Co., Ltd.; average particle size: 4 μm), so that the resulting mixture had a composition of 25 wt % of the titanium oxide, 25 wt % of the specific monomer-modified polyethylene wax, 15 wt % of the dimethyl silicone, 5 wt % of the POE nonylphenyl ether, 25 wt % of kerosene, and 5 wt % of the aluminum oxide, which was then agitated with a mixer to be entirely emulsified, and allowed to cool down to room temperature to prepare a hard surface-treating agent in an emulsion form.

Comparative Example 12

A montan oxidized wax (trade name: Hoechst S, made by Hoechst Japan Ltd.; melting point: 84° C.), dimethyl silicone (trade name: SH-200, made by Toray Dow Corning, Inc.; viscosity: 10 cs) and kerosene were mixed while being heated to 90° C., and then admixed with a 95° C. heated mixture of tap water, titanium oxide (trade name: P25, made by Nihon Aerosil, Ltd.; average particle size: 21 nm), an alkylbenzenesulfonic amine salt (trade name: Neogen T, made by Daiichi Seiyaku Co., Ltd. and aluminum oxide, so that the resulting mixture had a composition of 10 wt % of the titanium oxide, 10 wt % of the montan oxidized wax, 15 wt % of the dimethyl silicone, 2 wt % of the alkylbenzensulfonic amine salt, 33 wt % of kerosene, and 30 wt % of tap water, which was then agitated with a mixer to be entirely emulsified, and then allowed to cool down to room temperature to prepare a hard surface-treating agent in a semi-paste emulsion form.

The following tests were carried out on the hard surface-treating agents obtained in Examples 1 to 15 and Comparative Examples 1 to 12:

Test 1

This test was carried out for the purpose of evaluating the workability, influence of applying, and stain-proofing of the hard surface-treating agents.

Four cars, TOYOTA MARK II 1988 (white coating), TOYOTA CORONA EXIV 1990 (white coating), MITSUBISHI FTO 1995 (white coating) and NISSAN AD Van (white coating) were washed on the coated surfaces of the hood, roof and trunk of each thereof. Iron powders were then removed with trapping clay from the surfaces. Then, fur was cleaned with a cleaner and buff. Thereafter, the degreasing with kerosene was carried out to remove an amount of waxes retained on the coated surfaces.

The surfaces of the hood and roof (except the AD Van) were divided with a masking tape in twelve (12) sections, the surface of the roof of the AD Van divided in eighteen (18) sections, and the surface of the trunk divided in six (6) sections. Onto these sections were applied the hard surface-treating agents obtained in the Examples and Comparative Examples above through a normal waxing method. These applied sections were left to stand for drying for one hour. The applied hard surface-treating agent was wiped away. The degree of wiping-away was evaluated (workability).

After the hard surface-treating agent was wiped away, the masking tapes were released, and the cars were left to stand for the given periods below.

The influence of the applying of the agents was evaluated at each of the ends of the periods of one (1) month, three (3) months and six (6) months, respectively. Furthermore, the degree of staining was evaluated at each of the ends of the periods of one (1) month, three (3) months and six (6) months.

Criteria

Workability

The surfaces were wiped with a cleaned towel folded in three. One of the sections was wiped with one area of the folded towel. The degree of wiping-away was evaluated with the following criteria:

Dried hard surface-treating agent was wiped away by wiping one or two times ⊚ by wiping three to five times ◯ by wiping six to ten times △

Dried hard surface-treating agent was not wiped away by wiping more than ten times X The results are shown in Table 1.

Influence on the Coated Surface of the Hard Surface-treating Agent

The sections tested above were washed with tap water using a sponge, and the degree of influence on the sections was evaluated by visual inspection. The sections evaluated as being influenced were abraded with Compound 5982 made by 3M Company, and the degree of removing the results of influence from so evaluated ones of the sections was evaluated with the following criteria:

No influence was found ◯

An amount of influence was found, but the results of influence abraded away △

An amount of influence was found, but the results of influence not abraded X

The "amount of influence was found" above means that the coated surface was attacked and whitened, roughened or kept stained even when abraded with the compound.

Test for Evaluating the Degree of Staining

With the sections the cars above, the degree of whitening, to which the sections were whitened, was measured with Color Analyzer TC-1800 (made by Tokyo Denshoku Co., Ltd.). The sections washed with tap water using a sponge were compared with those before the washing with respect to this degree.

The degree of staining was calculated based on the degree of whitening in accordance with the following formula:

Degree of staining=100−$A/B$×100(%)

wherein A means the degree of whitening after the cars were left to stand, and B means the degree of whitening before the cars were left to stand.

The degree of whitening after fur was removed from the cars was 72.4 for the TOYOTA MARK II 1988, 75.5 for the TOYOTA CORONA EXIV 1990, 60.4 for MITSUBISHI FTO 1995, and 80.2 for the NISSAN AD Van. This degree is "the degree of whitening before the cars were left to stand".

The average value of the degree of staining was calculated from the values of the four cars, and this average value is herein referred to as "the degree of staining". This degree of staining calculated and the degree visually observed have the following relations:

0% ≤ degree of staining < 2.0%: Not stained ◎
2.0% ≤ degree of staining < 10.0%: Slightly stained ○
10.0% ≤ degree of staining < 15.0%: Stained △
15.0% ≤ degree of staining < 20%: Highly stained X The results are shown in Table 2.

TABLE 1 (1)

| Example | Work-ability | Influence on coated surface ||||
|---|---|---|---|---|---|
| | | Before left to stand | After left to stand for one month | After left to stand for three months | After left to stand for six months |
| 1 | ○ | ○ | ○ | ○ | ○ |
| 2 | ◎ | ○ | ○ | △ | △ |
| 3 | ○ | ○ | ○ | ○ | ○ |
| 4 | ○ | ○ | ○ | ○ | ○ |
| 5 | ◎ | ○ | ○ | △ | △ |
| 6 | ○ | ○ | ○ | △ | △ |
| 7 | ○ | ○ | ○ | ○ | ○ |
| 8 | ○ | ○ | ○ | ○ | ○ |
| 9 | ◎ | ○ | ○ | ○ | ○ |
| 10 | ○ | ○ | ○ | ○ | ○ |
| 11 | ○ | ○ | ○ | ○ | ○ |
| 12 | ○ | ○ | ○ | △ | △ |
| 13 | ○ | ○ | ○ | ○ | ○ |
| 14 | ○ | ○ | ○ | ○ | ○ |
| 15 | ○ | ○ | ○ | ○ | ○ |

TABLE 1 (2)

| Comparative Example | Work-ability | Influence on coated surface ||||
|---|---|---|---|---|---|
| | | Before left to stand | After left to stand for one month | After left to stand for three months | After left to stand for six months |
| 1 | △ | ○ | ○ | ○ | ○ |
| 2 | △ | ○ | ○ | ○ | ○ |
| 3 | ○ | ○ | ○ | ○ | ○ |
| 4 | ○ | ○ | X | X | X |
| 5 | X | ○ | △ | △ | △ |
| 6 | △ | ○ | X | X | X |
| 7 | X | ○ | ○ | ○ | ○ |
| 8 | ○ | ○ | ○ | ○ | ○ |
| 9 | ○ | ○ | X | X | X |
| 10 | ○ | ○ | ○ | ○ | ○ |
| 11 | X | ○ | ○ | ○ | ○ |
| 12 | ○ | ○ | ○ | ○ | ○ |

TABLE 2 (1)

| Example | Observation of Staining and Degree of staining (%) |||||| 
|---|---|---|---|---|---|---|
| | Left to stand for one month || Left to stand for three months || Left to stand for six months ||
| | Before washing | After washing | Before washing | After washing | Before washing | After washing |
| 1 | ○ 3.3% | ◎ 1.8% | ◎ 1.5% | ◎ 1.5% | ◎ 1.6% | ◎ 1.5% |
| 2 | ◎ 1.7% | ◎ 1.5% | ◎ 1.2% | ◎ 1.0% | ◎ 1.0% | ◎ 1.0% |
| 3 | ○ 4.4% | ◎ 1.8% | ◎ 1.6% | ◎ 1.5% | ◎ 1.5% | ◎ 1.5% |
| 4 | ○ 3.0% | ◎ 1.7% | ◎ 1.7% | ◎ 1.6% | ◎ 1.6% | ◎ 1.4% |
| 5 | ◎ 1.6% | ◎ 1.3% | ◎ 1.2% | ◎ 1.2% | ◎ 1.3% | ◎ 1.2% |
| 6 | ◎ 1.4% | ◎ 1.3% | ◎ 1.1% | ◎ 1.0% | ◎ 1.1% | ◎ 1.0% |
| 7 | ○ 2.9% | ◎ 1.8% | ◎ 1.5% | ◎ 1.4% | ◎ 1.3% | ◎ 1.3% |
| 8 | ○ 5.2% | ◎ 1.9% | ◎ 1.8% | ◎ 1.7% | ◎ 1.7% | ◎ 1.6% |
| 9 | ○ 6.5% | ◎ 1.8% | ◎ 1.8% | ◎ 1.8% | ◎ 1.7% | ◎ 1.7% |
| 10 | ○ 4.9% | ◎ 1.8% | ◎ 1.7% | ◎ 1.6% | ◎ 1.7% | ◎ 1.6% |
| 11 | ○ 3.1% | ◎ 1.7% | ◎ 1.7% | ◎ 1.5% | ◎ 1.5% | ◎ 1.5% |
| 12 | ◎ 1.5% | ◎ 1.3% | ◎ 1.3% | ◎ 1.2% | ◎ 1.3% | ◎ 1.1% |
| 13 | ○ 2.8% | ◎ 1.6% | ◎ 1.7% | ◎ 1.6% | ◎ 1.6% | ◎ 1.6% |
| 14 | ○ 3.8% | ◎ 1.8% | ◎ 1.8% | ◎ 1.6% | ◎ 1.7% | ◎ 1.6% |
| 15 | ○ 3.0% | ◎ 1.9% | ○ 2.5% | ○ 2.2% | △ 10.0% | ○ 8.5% |

TABLE 2 (2)

| Comparative Example | Observation of Staining and Degree of staining (%) ||||||
|---|---|---|---|---|---|---|
| | Left to stand for one month || Left to stand for three months || Left to stand for six months ||
| | Before washing | After washing | Before washing | After washing | Before washing | After washing |
| 1 | △ 14.3% | △ 12.1% | X 18.5% | △ 14.0% | X 19.0% | X 18.5% |
| 2 | △ 13.8% | △ 13.0% | X 19.1% | △ 14.8% | X 19.3% | X 19.0% |
| 3 | △ 13.6% | △ 12.5% | X 19.3% | △ 14.5% | X 19.3% | X 19.3% |
| 4 | ○ 1.2% | ◎ 0.8% | ◎ 0.9% | ◎ 0.8% | ◎ 0.7% | ◎ 0.5% |
| 5 | △ 14.3% | △ 13.8% | X 17.5% | X 16.4% | X 18.0% | X 17.8% |
| 6 | ◎ 1.8% | ◎ 1.5% | ◎ 1.6% | ◎ 1.4% | ◎ 1.4% | ◎ 1.3% |
| 7 | △ 13.3% | △ 12.1% | △ 14.5% | △ 12.8% | X 18.3% | X 18.0% |
| 8 | X 18.5% | △ 14.8% | X 17.7% | △ 14.8% | X 18.8% | X 18.7% |
| 9 | ○ 1.4% | ◎ 1.0% | ◎ 1.0% | ◎ 1.0% | ◎ 0.8% | ◎ 0.8% |

TABLE 2 (2)-continued

| | Observation of Staining and Degree of staining (%) | | | | | |
|---|---|---|---|---|---|---|
| | Left to stand for one month | | Left to stand for three months | | Left to stand for six months | |
| Comparative Example | Before washing | After washing | Before washing | After washing | Before washing | After washing |
| 10 | Δ 14.2% | Δ 13.5% | Δ 14.5% | Δ 14.0% | X 18.9% | X 18.7% |
| 11 | Δ 13.0% | Δ 12.6% | Δ 14.3% | Δ 13.5% | X 18.7% | X 18.7% |
| 12 | Δ 14.8% | Δ 14.3% | X 17.9% | X 17.5% | X 19.2% | X 19.2% |

Test 2

This test was carried out for the purpose of evaluating the workability, influence of applying, and water spot formation-preventing effect the hard surface-treating agents.

Four cars, HONDA CIVIC 1991 (dark green metallic coating), TOYOTA CARINA 1991 (dark blue metallic coating), TOYOTA CAROLA 1995 (dark blue metallic coating) and TOYOTA CROWN 1998 (dark blue metallic coating) were washed on the coated surfaces of the hood, roof and trunk of each thereof. Iron powders were then removed with trapping clay from the surfaces. Then, stains were removed with a compound. Thereafter, the degreasing with kerosene was carried out to remove an amount of waxes retained on the coated surfaces.

The surfaces of the hood and roof were divided with a masking tape in twelve (12) sections, and the surface of the trunk divided in six (6) sections. Onto these sections were applied the hard surface-treating agents, respectively, obtained in the Examples 1, 2, 3, 4, 5, 8, 9, 10, 11 and 14 and Comparative Examples 1, 2, 3, 4, 5, 8, 9 and 12 above through a normal waxing method. Examples 6, 7, 12 and 13, and Comparative Examples 6, 7, 10 and 11 were not adopted in this test, because the hard surface-treating agents of these Examples and Comparative Examples contain the abrasives, which scratch the metallic coating surfaces of the cars. These applied sections were left to stand for drying for one hour. The applied hard surface-treating agent was wiped away. The degree of wiping-away was evaluated (workability).

After the hard surface-treating agents were wiped away, the masking tapes were released, and the cars were left to stand for the given periods below.

The influence of the agents on the coated surfaces was evaluated directly after the cars were started to be left to stand, and at each of the ends of the periods of one (1) month, three (3) months and six (6) months, and the degree of staining was evaluated at each of the ends of the periods of one (1) month, three (3) months and six (6) months.

Criteria

Workability

The surfaces were wiped with a cleaned towel folded in three. One of the sections was wiped with one area of the folded towel. The degree of wiping-away was evaluated with the following criteria:

Dried hard surface-treating agent was wiped away
  by wiping one or two times ⊙
  by wiping three to five times ○
  by wiping six to ten times Δ
Dried hard surface-treating agent was not wiped away
  by wiping more than ten times X The results are shown in Table 3.

Influence on the Coated Surface of the Hard Surface-treating Agent

The sections tested above were washed with tap water using a sponge, and the degree of influence on the sections was evaluated by visual inspection. The sections evaluated as being influenced were abraded with Compound 5982 made by 3 M Company, and the degree of removing the results of influence from so evaluated ones of the sections was evaluated with the following criteria:

No influence was found ○
An amount of influence was found,
  but the results of influence abraded away Δ
An amount of influence was found,
  but the results of influence not abraded X Water Spot Formation-preventing Effect On a fine day within three days including an appointed day as a middle day, the cars were washed at the sections to be tested thereof with tap water using a sponge, and the amount of water on the sections were then wiped away. Then, it was visually observed whether water spots were formed on the sections. Thereafter, an amount of water was applied onto the hoods, roofs and trunks of the cars. They were dried with the sun.

The results are shown in Table 4.

TABLE 3 (1)

| | | Influence on coated surface | | | |
|---|---|---|---|---|---|
| Example | Work-ability | Before left to stand | After left to stand for one month | After left to stand for three months | After left to stand for six months |
| 1 | ○ | ○ | ○ | ○ | ○ |
| 2 | ⊙ | ○ | ○ | Δ | Δ |
| 3 | ○ | ○ | ○ | ○ | ○ |
| 4 | ○ | ○ | ○ | ○ | ○ |
| 5 | ⊙ | ○ | ○ | Δ | Δ |
| 8 | ○ | ○ | ○ | ○ | ○ |
| 9 | ⊙ | ○ | ○ | ○ | ○ |
| 10 | ○ | ○ | ○ | ○ | ○ |
| 11 | ○ | ○ | ○ | ○ | ○ |
| 14 | ○ | ○ | ○ | ○ | ○ |

TABLE 3 (2)

| | | Influence on coated surface | | | |
|---|---|---|---|---|---|
| Comparative Example | Work-ability | Before left to stand | After left to stand for one month | After left to stand for three months | After left to stand for six months |
| 1 | Δ | ○ | ○ | ○ | ○ |
| 2 | Δ | ○ | ○ | ○ | ○ |
| 3 | ○ | ○ | ○ | ○ | ○ |
| 4 | ⊙ | ○ | X | X | X |

TABLE 3 (2)-continued

| | | Influence on coated surface | | | |
|---|---|---|---|---|---|
| Comparative Example | Workability | Before left to stand | After left to stand for one month | After left to stand for three months | After left to stand for six months |
| 5 | X | ○ | Δ | Δ | Δ |
| 8 | ○ | ○ | ○ | ○ | ○ |
| 9 | ○ | ○ | X | X | X |
| 12 | ○ | ○ | ○ | ○ | ○ |

TABLE 4 (1)

| | Water spot formation-preventing effect | | | | | |
|---|---|---|---|---|---|---|
| | Left to stand for one month | | Left to stand for three months | | Left to stand for six months | |
| Example | After washing | Naturally dried | After washing | Naturally dried | After washing | Naturally dried |
| 1 | nil | nil | nil | nil | nil | nil |
| 2 | nil | nil | nil | nil | nil | nil |
| 3 | nil | nil | nil | nil | nil | nil |
| 4 | nil | nil | nil | nil | nil | nil |
| 5 | nil | nil | nil | nil | nil | nil |
| 8 | nil | nil | nil | nil | nil | nil |
| 9 | nil | nil | nil | nil | nil | nil |
| 10 | nil | nil | nil | nil | nil | nil |
| 11 | nil | nil | nil | nil | nil | nil |
| 14 | nil | nil | nil | nil | nil | nil |

TABLE 4 (2)

| | Water spot formation-preventing effect | | | | | |
|---|---|---|---|---|---|---|
| | Left to stand for one month | | Left to stand for three months | | Left to stand for six months | |
| Comparative Example | After washing | Naturally dried | After washing | Naturally dried | After washing | Naturally dried |
| 1 | found | found | found | found | found | found |
| 2 | found | found | found | found | found | found |
| 3 | found | found | found | found | found | found |
| 4 | nil | nil | nil | nil | nil | nil |
| 5 | found | found | found | found | found | found |
| 8 | found | found | found | found | found | found |
| 9 | nil | nil | nil | nil | nil | nil |
| 12 | found | found | found | found | found | found |

Industrial Advantage of Use

The hard surface-treating agent of this invention can easily be applied with a cloth onto the surfaces of cars in the same manner as the conventional waxes are applied, to form a film containing titanium oxide on the surfaces. Therefore, general users can easily apply the titanium oxide-containing film on the surfaces of cars or other things without any help of a specialist.

The hard surface-treating agent of this invention is good in the stain-proofing property, which is maintained for a long period of time. Therefore, the hard surface-treating agent of this invention is used as a stain-proofing agent.

The hard surface-treating agent of this invention has a water spot formation-preventing effect, which is maintained for a long period of time. Therefore, the hard surface-treating agent of this invention is used as a water spot formation-preventing agent.

What is claimed is:

1. A hard surface-treating agent, which comprises titanium oxide of an anatase form, a thermoplastic resin and a mixture of an organic solvent and water, said titanium oxide and said thermoplastic resin being dispersed in the mixture of an organic solvent and water, wherein the content of said titanium oxide is within the range of 0.05–20 wt % and the content of the thermoplastic resin within the range of 0.05–20 wt %.

2. A stain-proofing agent, which comprises titanium oxide of an anatase form, a thermoplastic resin and a mixture of an organic solvent and water, said titanium oxide and said thermoplastic resin being dispersed in said mixture of an organic solvent and water, wherein the content of said titanium oxide is within the range of 0.05–20 wt % and the content of said thermoplastic resin within the range of 0.05–20 wt %.

3. A surface treating method, which comprises applying a treating agent comprising titanium oxide of an anatase form, a thermoplastic resin and a mixture of an organic solvent and water, said titanium oxide and said thermoplastic resin being dispersed in said mixture of an organic solvent and water, wherein the content of said titanium oxide is within the range of 0.05–20 wt % and the content of said thermoplastic resin within the range of 0.05–20 wt %.

4. The surface treating method according to claim 3, wherein said titanium oxide has an average particle size of 8–3,000 nm.

5. The surface treating method according to claim 3, wherein the content of said titanium oxide is within the range of 0.1–10 wt %, and the content of said thermoplastic resin within the range of 0.1–10 wt %.

6. The surface treating method according to claim 3, wherein said thermoplastic resin is at least one selected from the group consisting of polyolefin waxes and modified products thereof, and polyolefin resins and modified products thereof.

7. The surface treating method according to claim 3, wherein said thermoplastic resins is at least one selected from the group consisting of polyethylene wax, polyolefin waxes and modified products thereof, polyolefin resins and modified products thereof.

8. The surface treating method according to claim 5, wherein said organic solvent is of a silicone.

9. The surface treating method according to claim 3, wherein said surface-treating agent contains a surfactant.

* * * * *